United States Patent
Nakayama et al.

(10) Patent No.: US 10,141,109 B2
(45) Date of Patent: Nov. 27, 2018

(54) POWER STORAGE MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Seishi Kimura, Mie (JP); Katsushi Miyazaki, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/574,413

(22) PCT Filed: May 10, 2016

(86) PCT No.: PCT/JP2016/063801
§ 371 (c)(1),
(2) Date: Nov. 15, 2017

(87) PCT Pub. No.: WO2016/190075
PCT Pub. Date: Dec. 1, 2016

(65) Prior Publication Data
US 2018/0122574 A1 May 3, 2018

(30) Foreign Application Priority Data

May 28, 2015 (JP) .................. 2015-108283

(51) Int. Cl.
H05K 7/02 (2006.01)
H05K 7/04 (2006.01)
(Continued)

(52) U.S. Cl.
CPC .............. H01G 2/04 (2013.01); B60L 3/0046 (2013.01); B60L 11/1879 (2013.01);
(Continued)

(58) Field of Classification Search
CPC .......... H01G 2/04; H01G 11/10; H01M 2/04; H01M 2/10; H01M 2/20; H01M 10/482
(Continued)

(56) References Cited

U.S. PATENT DOCUMENTS 5,985,480 A 11/1999 Sato et al.
6,261,719 B1 * 7/2001 Ikeda .................. H01M 2/202
429/120
(Continued)

FOREIGN PATENT DOCUMENTS

JP 2013004186 A 1/2013
JP 2013054966 A 3/2013
(Continued)

OTHER PUBLICATIONS

International Search Report for Application No. JP2016/063801 dated Jul. 12, 2016; 5 pages.

*Primary Examiner* — Hung S Bui
(74) *Attorney, Agent, or Firm* — Reising Ethington, P.C.

(57) ABSTRACT

A power storage module includes multiple power storage elements that each have cathode and anode electrode portions, connection members that connect the cathodes and anodes of the power storage elements and are fixed to the power storage elements by a fixing means, and an insulating protector that houses the connection members. The insulating protector includes opposing portions that oppose sur-
(Continued)

faces of the connection members, and withdrawal restriction portions that restrict withdrawal of the connection members from the other surface side. At least one of the opposing portions and the withdrawal restriction portions have a first clearance with respect to the connection members. The insulating protector further includes restriction portions that restrict movement relative to the power storage elements by an amount greater than or equal to a second clearance that is smaller than the first clearance.

3 Claims, 12 Drawing Sheets

(51) Int. Cl.
| | | |
|---|---|---|
| *H01G 2/04* | (2006.01) | |
| *H01G 11/10* | (2013.01) | |
| *H01M 2/04* | (2006.01) | |
| *H01M 2/10* | (2006.01) | |
| *H01M 2/20* | (2006.01) | |
| *B60L 3/00* | (2006.01) | |
| *B60L 11/18* | (2006.01) | |
| *H01M 2/12* | (2006.01) | |
| *H01M 10/48* | (2006.01) | |
| *H01G 11/82* | (2013.01) | |

(52) U.S. Cl.
CPC ............. *H01G 11/10* (2013.01); *H01G 11/82* (2013.01); *H01M 2/04* (2013.01); *H01M 2/10* (2013.01); *H01M 2/1252* (2013.01); *H01M 2/20* (2013.01); *H01M 10/482* (2013.01); *H01M 2220/20* (2013.01)

(58) Field of Classification Search
USPC ......................................... 361/807, 809, 810
See application file for complete search history.

(56) References Cited

U.S. PATENT DOCUMENTS

| | | | |
|---|---|---|---|
| 6,523,274 B1* | 2/2003 | Saito | B60R 16/0239 |
| | | | 180/68.5 |
| 8,304,655 B2* | 11/2012 | Ikeda | H01R 31/085 |
| | | | 174/133 B |
| 8,545,271 B2* | 10/2013 | Henmi | H01M 2/1083 |
| | | | 439/208 |
| 8,580,423 B2* | 11/2013 | Kim | H01M 2/1061 |
| | | | 429/121 |
| 2011/0104555 A1 | 5/2011 | Han et al. | |
| 2012/0009447 A1 | 1/2012 | Ikeda et al. | |
| 2014/0065468 A1* | 3/2014 | Nakayama | H01M 2/206 |
| | | | 429/160 |
| 2014/0335393 A1 | 11/2014 | Wada et al. | |
| 2016/0021772 A1 | 1/2016 | Nakayama et al. | |

FOREIGN PATENT DOCUMENTS

| | | |
|---|---|---|
| JP | 2013093307 A | 5/2013 |
| JP | 2013152918 A | 8/2013 |
| JP | 2013247056 A | 12/2013 |
| JP | 2014082080 A | 8/2014 |

* cited by examiner

POWER STORAGE MODULE

CROSS REFERENCE TO RELATED APPLICATIONS

This application claims the priority of Japanese patent application JP2015-108283 filed on May 28, 2015, the entire contents of which are incorporated herein.

TECHNICAL FIELD

The present specification discloses technology related to a power storage module.

BACKGROUND ART

Vehicles such as an electric automobile and a hybrid automobile are provided with a power storage module that is constituted by connecting multiple power storage elements in series or in parallel. A wiring module includes a connection member that is made of metal and connects electrode terminals, and an insulating protector that houses the connection member, and this wiring module is attached to some power storage modules among the aforementioned type of power storage module.

A battery wiring module in Patent Document 1 (JP2013-33634A) includes a protector that is made of a synthetic resin and includes a bottom plate on which bus bars are placed, lock pieces that prevent the bus bars from falling out, and positioning portions that protrude toward electric cells. After the positioning portions are fitted to electrode portions and electrode holding portions for positioning thereof, the battery wiring module is attached to the electric cell group by bolt fastening.

SUMMARY

In Patent Document 1, the bus bars are fixed to the electric cells by bolt fastening, and a clearance is formed between the bus bars and the bottom plate and lock pieces of the protector, and therefore the protector is allowed to move relative to the bus bars and the electric cells within the range of the clearance. For this reason, if the power storage module is disposed at a location where vibration occurs in a vehicle or the like, there is a possibility that due to the vibration, the protector will move relative to the power storage element to the limit of the range of the clearance. If the protector moves to the limit of the clearance, and the bottom plate or lock pieces come into contact with the bus bars, the load of electrical wires or the like on the protector is applied to the bus bars via the protector, and there is concern of a problem such as deformation of or damage to the bus bars.

The present design was achieved in light of the above-described situation, and an object thereof is to suppress the application of a load to connection members from an insulating protector.

A power storage module according to the present design includes: a plurality of power storage elements that each have cathode and anode electrode portions; a connection member that connects the cathodes and anodes of the power storage elements to each other and is fixed to the power storage elements by a fixing means; and an insulating protector in which the connection member is housed, wherein the insulating protector includes an opposing portion that opposes one surface of the connection member, and a withdrawal restriction portion that restricts withdrawal of the connection member from another surface side of the connection member, and at least one of the opposing portion and the withdrawal restriction portion has a first clearance with respect to the connection member, and the insulating protector further includes a restriction portion that restricts movement relative to the power storage elements by an amount greater than or equal to a second clearance that is smaller than the first clearance.

When the insulating protector vibrates relative to the power storage elements due to vehicle vibration or the like, there is concern that the opposing portion and withdrawal restriction portion come into contact with the connection member and apply a load to the connection member, but according to the above configuration, the restriction portion of the insulating protector restricts movement relative to the power storage elements by an amount greater than or equal to the second clearance that is smaller than the first clearance, and therefore the restriction portion can restrict movement of the insulating protector relative to the power storage elements before the opposing portion and the withdrawal restriction portion come into contact with the connection member. Accordingly, even if the insulating protector vibrates relative to the power storage elements, the opposing portion and the withdrawal restriction portion do not come into contact with the connection member, and therefore it is possible to suppress the application of a load to the connection member from the insulating protector.

The following aspects are preferable as embodiments of the present design.

The power storage elements each have the electrode portions and a main body portion in which a power storage element is housed in a case, and the restriction portion is locked to the case.

According to this configuration, the restriction portion can be locked to the power storage elements with use of the cases of the power storage elements.

The power storage module further includes a plurality of the connection members, wherein the insulating protector includes a plurality of housing portions that each have the opposing portion and the withdrawal restriction portion and respectively house the connection members, and a connection portion that connects the plurality of housing portions, and the restriction portion is provided on the connection portion.

According to the present design, it is possible to suppress the application of a load to connection members from an insulating protector.

DESCRIPTION OF EMBODIMENTS

First Embodiment

A first embodiment will be described below with reference to FIGS. 1 to 12.

A power storage module 10 of the present embodiment is installed in a vehicle such as an electric automobile or a hybrid automobile, and is used as a power supply for driving the vehicle. In the following description, the X direction is leftward, the Y direction is upward, and the Z direction is forward.

Figure 1:
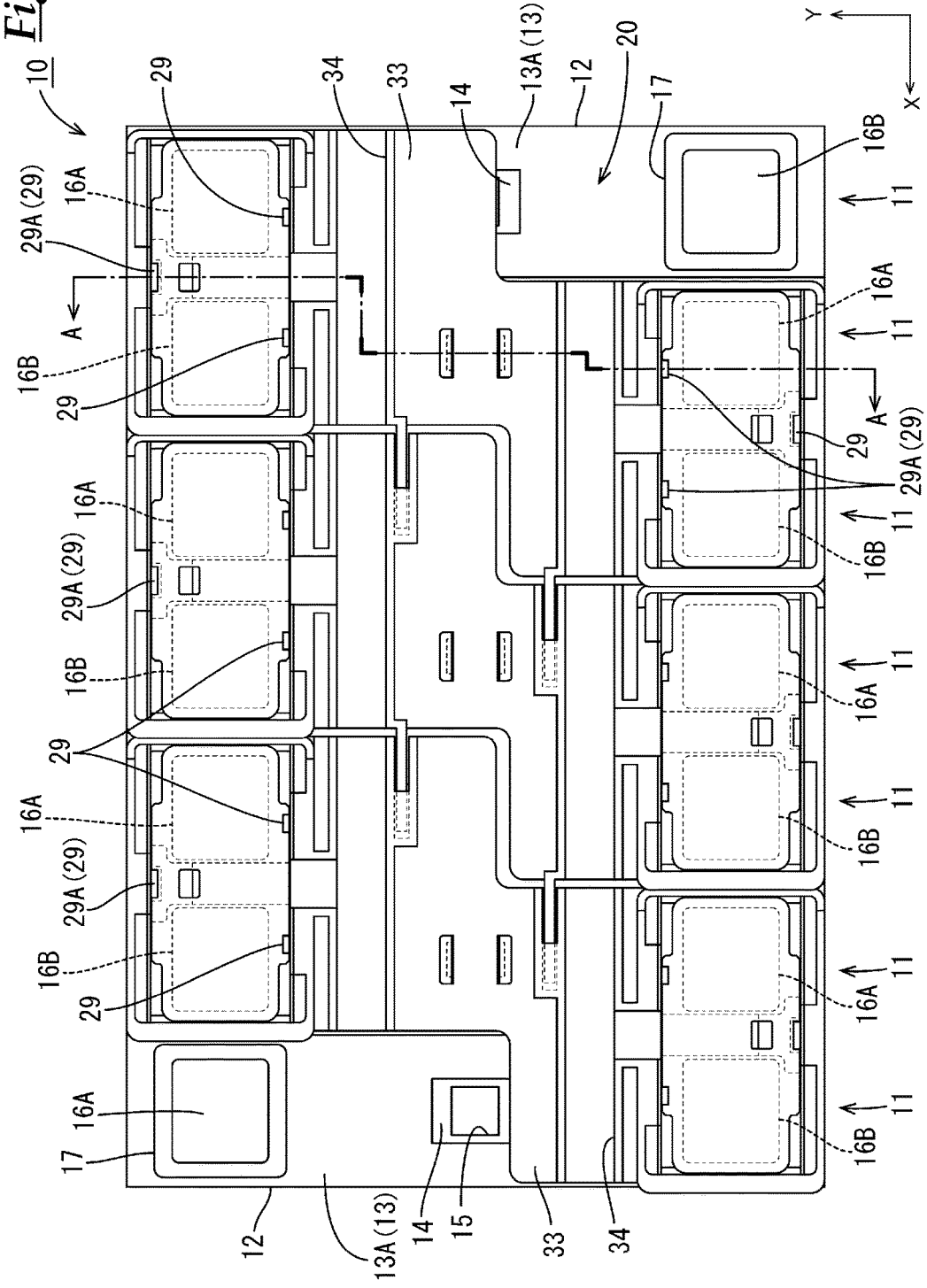
FIG. 1 is a front view of a power storage module.

As shown in FIG. 1, the power storage module 10 includes multiple (seven in the present embodiment) power storage elements 11 that are arranged side-by-side in a horizontal line, and a wiring module 20 that is attached to the power storage elements 11. The power storage elements 11 each include a main body portion 12 in which a power storage element (not shown) is housed inside a case 13 that is shaped as a flattened rectangular parallelepiped, and electrode portions 16A and 16B (cathode denoted by 16A and anode denoted by 16B) that protrude from one surface of the main body portion 12.

Figure 2:
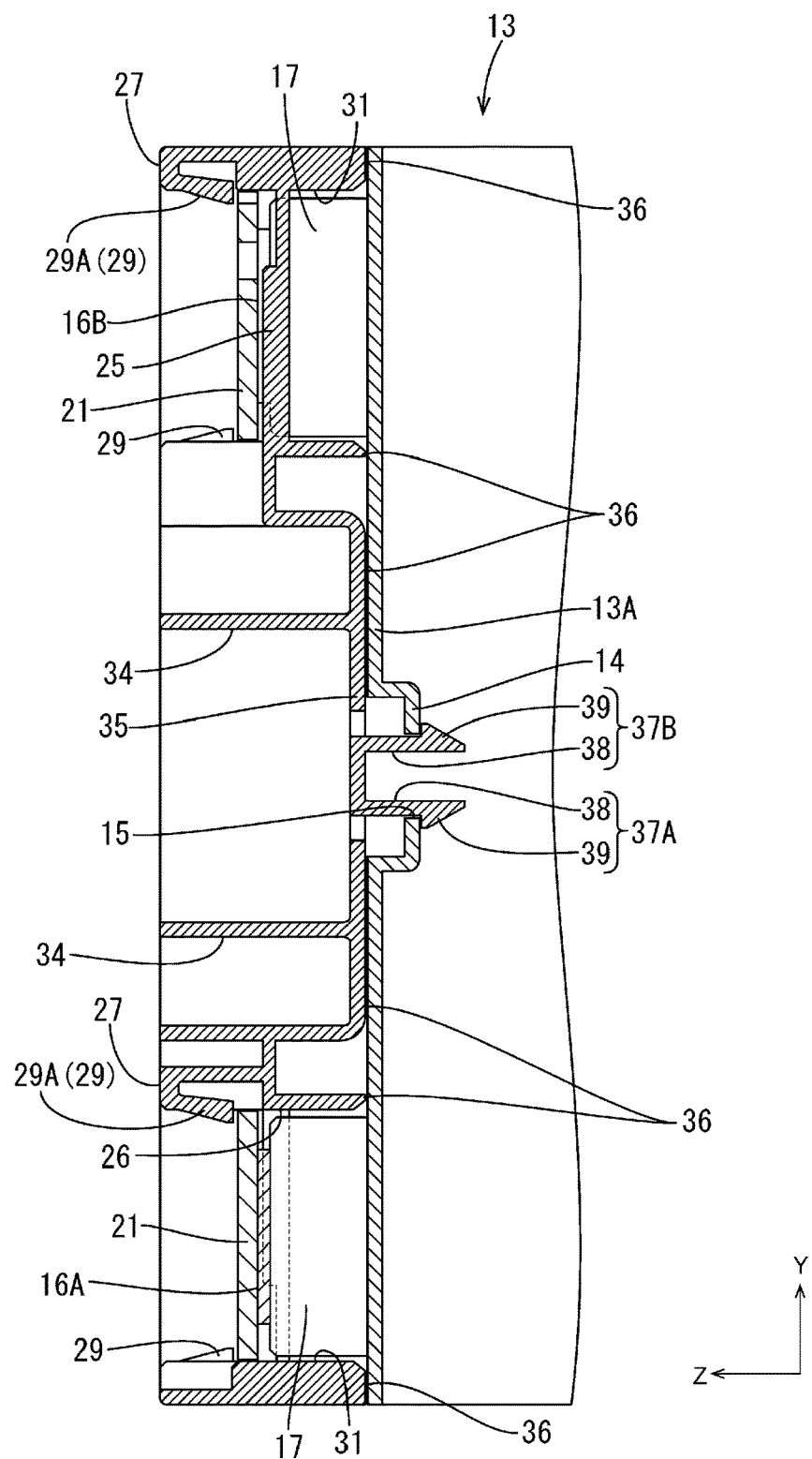
FIG. 2 is a cross-sectional view taken along A-A in FIG. 1.

As shown in FIG. 2, the electrode portions 16A and 16B have leading end portions in which metal is exposed, and the outer circumference on the main body portion 12 side has a large outer diameter due to being covered by an exterior portion 17 that is made of an insulating synthetic resin. The case 13 is made of synthetic resin or metal for example, and has a flat plate-shaped attachment surface portion 13A to which the wiring module 20 is attached. A depression portion 14 that is depressed inward is formed in the attachment surface portion 13A, and a rectangular locking hole 15 is formed passing through the depression portion 14. Adjacent power storage elements 11 are arranged such that adjacent electrode portions 16A and 16B have opposite polarities. The electrode portions 16A and 16B located at the ends of the series connection are connected to a device such as external inverter via electrical wires (not shown). The power storage elements 11 are fixed by a holding plate (not shown).

Figure 5:
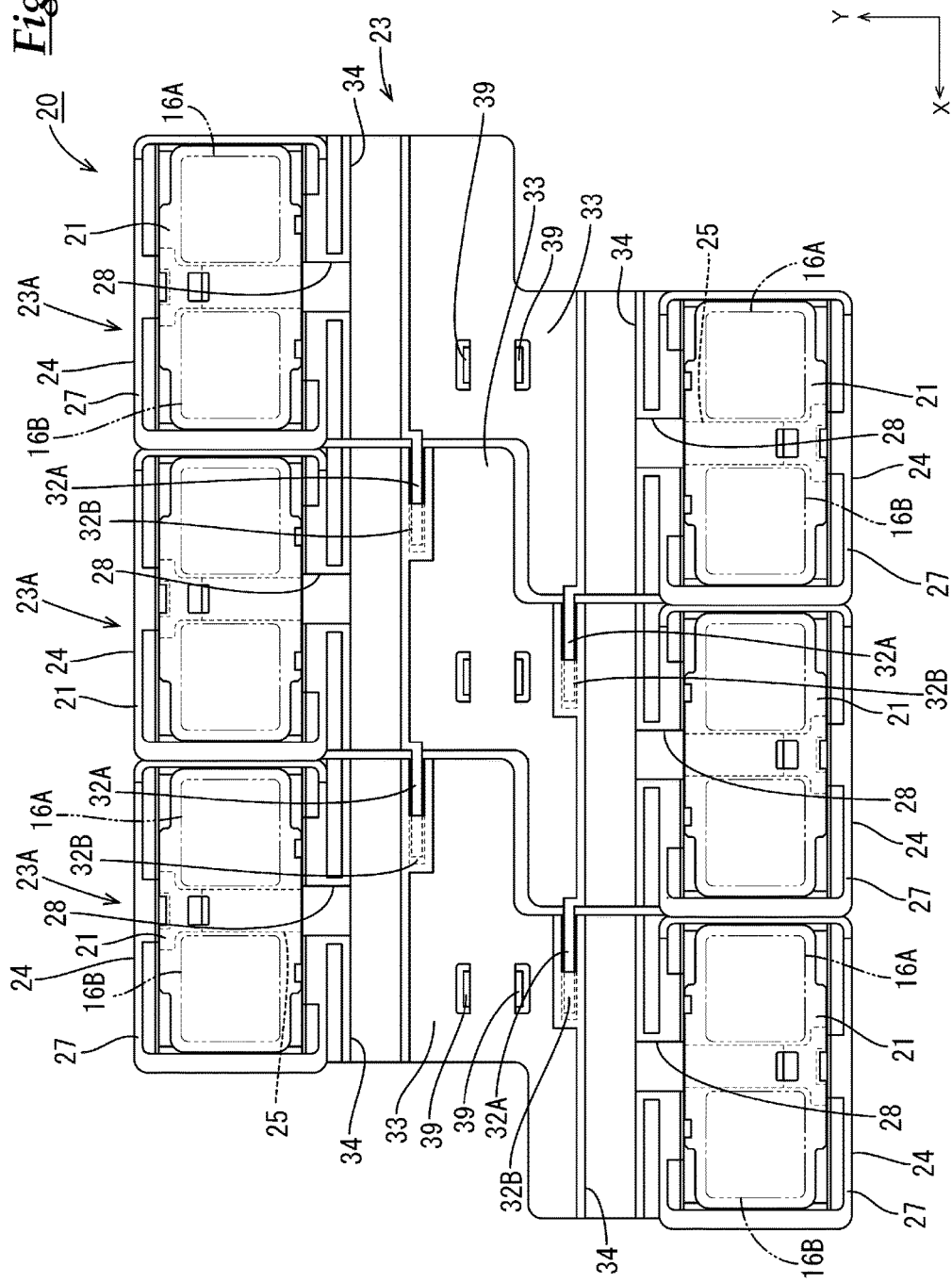
FIG. 5 is a front view of a wiring module.
Figure 6:
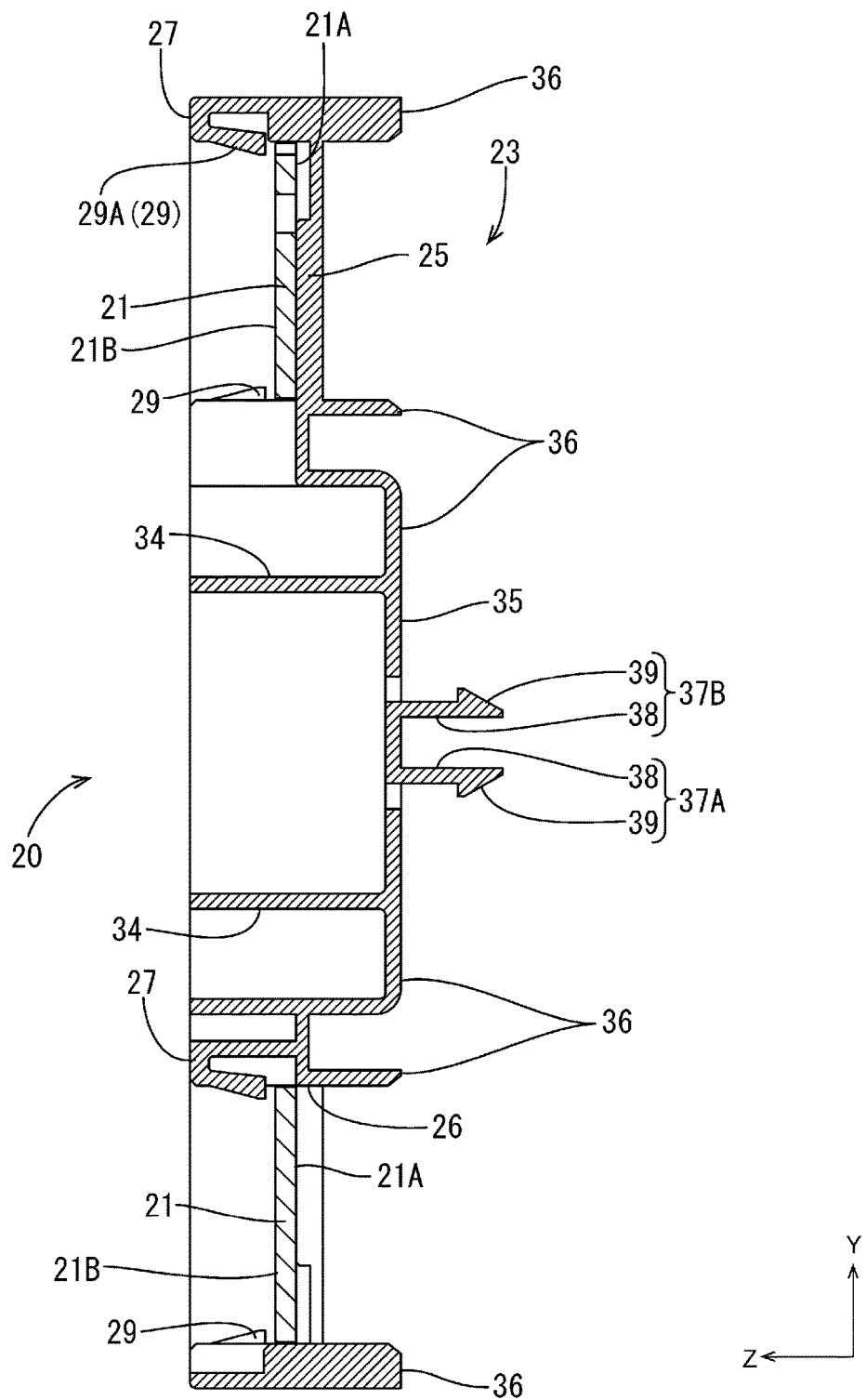
FIG. 6 is a cross-sectional view of the wiring module taken along A-A in FIG. 1.

As shown in FIGS. 5 and 6, the wiring module 20 is constituted including multiple connection members 21 that connect adjacent electrode portions 16A and 16B to each other, and an insulating protector 23 that houses the connection members 21.

Each connection member 21 is rectangular and constituted by a metal plate member that is made of copper, a copper alloy, aluminum, an aluminum alloy, stainless steel (SUS), or the like. The connection member 21 is formed large enough to cover the entirety of the end surfaces of the electrode portions 16A and 16B, and cutouts are formed in peripheral edge portions located in the vicinity of the corners. The connection member 21 is welded to the electrode portions 16A and 16B by laser welding (one example of "fixing means"). The connection member and the electrode portions 16A and 16B are therefore electrically connected in a state where the relative positions thereof are fixed.

Note that a voltage detection terminal (not shown) for detecting the voltage of the power storage element 11 may be overlaid on the connection member 21. An electrical wire connected to the voltage detection terminal is connected to an external ECU (Engine Control Unit) (not shown). The ECU includes a microcomputer, devices, and the like, and has a known configuration including functions for, for example, detecting the voltage, current, temperature, and the like of the power storage elements 11, and controlling charging and discharging of the power storage elements 11.

The insulating protector 23 is constituted by coupling multiple coupling units 23A, which are made of an insulating synthetic resin, on the left and right sides. The coupling units 23A each include multiple housing portions 24 that house the connection members 21, a connection portion 33 that connects the housing portions 24, and bar-shaped coupling portions 32A that couple adjacent coupling units 23A by being inserted into insertion portions 32B of neighboring coupling units 23A. When multiple coupling units 23A are coupled, two rows of housing portions 24 are formed with shifted positions in the alignment direction.

As shown in FIG. 6, the housing portions 24 each include an opposing portion 25 on which a connection member 21 can be placed such that one surface 21A of the connection member 21 (the surface on the power storage element 11 side) opposes the opposing portion 25, and a partition wall 27 that is shaped as a rectangular tube and surrounds the connection member 21. The opposing portion 25 is formed so as to be overlaid on an intermediate portion of the connection member 21 in the width direction thereof, and extends in a plate-like shape with a predetermined width dimension. Opening portions 26 through which the electrode portions 16A and 16B pass are formed on respective sides of the opposing portion 25. The partition wall 27 includes a pair of opposing wall portions that extend along the alignment direction of the power storage elements 11 and connecting wall portions that connect the pair of opposing wall portions.

The partition wall 27 includes multiple withdrawal restriction portions 29 that restrict withdrawal of the connection member 21 from another surface 21B side thereof (the side opposite to the power storage elements 11). The withdrawal restriction portions 29 protrude inward from inward surfaces of the pair of opposing wall portions of the partition wall 27, and one or more of the withdrawal restriction portions 29 is a withdrawal restriction portion 29A that extends in a cantilevered manner and can undergo bending deformation. When the withdrawal restriction portion 29A is bent outward, and a connection member 21 is arranged on the opposing portion 25, the withdrawal restriction portion 29A then undergoes restoration deformation, and a claw-shaped leading end portion of the withdrawal restriction portion 29 opposes the other surface 21B of the connection member 21, thus restricting withdrawal of the connection member 21.

Figure 3:
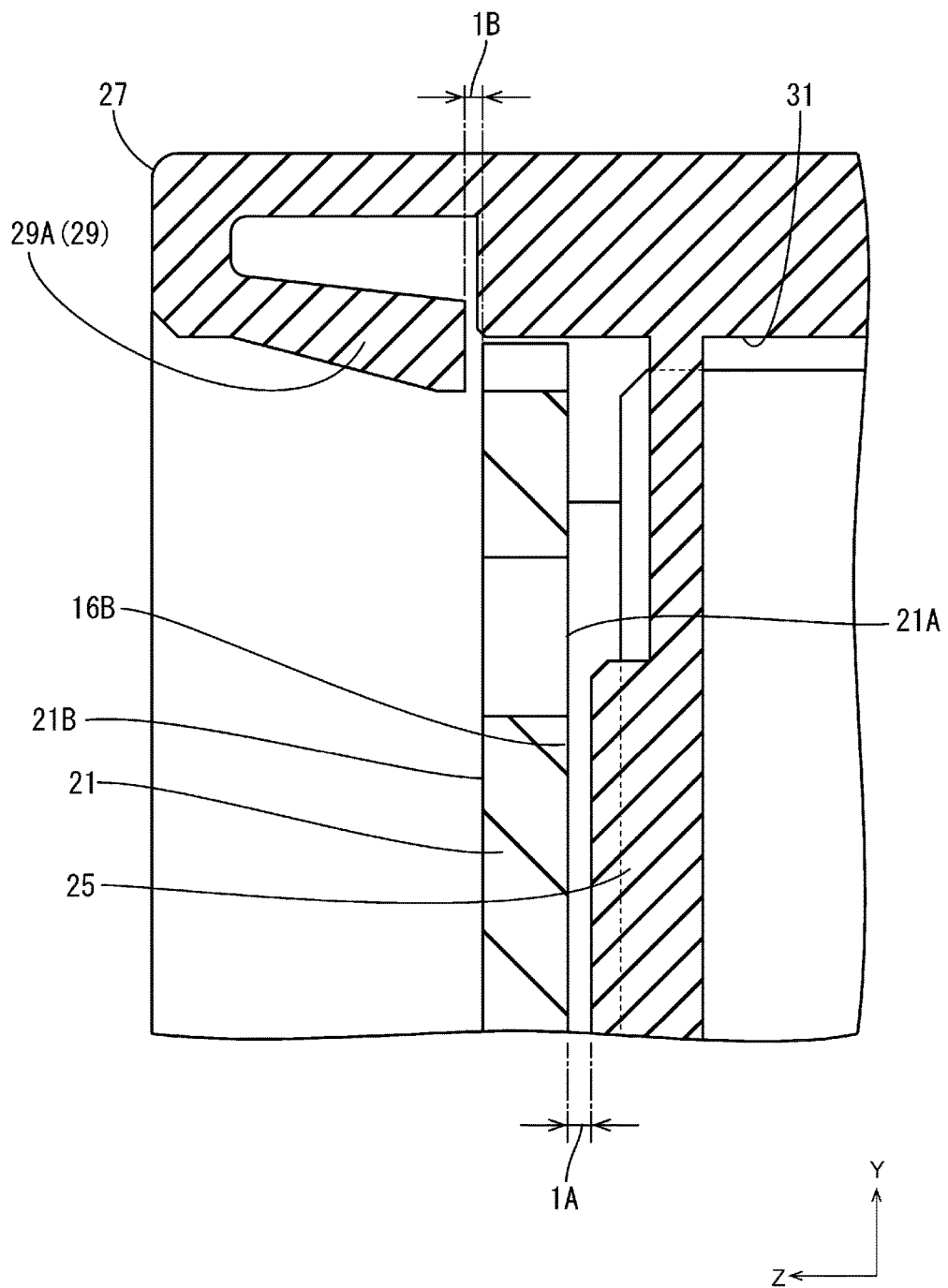
FIG. 3 is an enlarged view of the vicinity of a connection member in FIG. 2.

As described above, the connection member 21 is arranged between the opposing portion 25 and the withdrawal restriction portions 29, and the insulating protector 23 is not relatively fixed to the connection member 21. Accordingly, the insulating protector 23 is not relatively fixed to the power storage elements 11 to which the connection member 21 is fixed, and movement of the insulating protector 23 is allowed. Specifically, as shown in FIG. 3, the connection member 21 arranged between the opposing portion 25 and the withdrawal restriction portions 29 has clearances 1A+1B in the Z axis direction, the sum of which is equal to the result of subtracting the thickness of the connection member 21 from the distance between the opposing portion 25 and the withdrawal restriction portions 29. In other words, in the state where the wiring module 20 is attached to the power storage elements 11, the opposing portion 25 has a first clearance 1A with respect to the one surface 21A of the connection member 21, and the withdrawal restriction portion 29 has a first clearance 1B with respect to the other surface 21B of the connection member 21.

As shown in FIG. 2, positioning portions 31 into which the electrode portions 16A and 16B are fitted are provided in the surface of the housing portion 24 on the side on which the power storage elements 11 are arranged, and when the positioning portions 31 are fitted to the exterior portions 17 of the electrode portion 16A and 16B, the insulating protector 23 is positioned in the XY plane relative to the power storage elements 11.

As shown in FIG. 6, the connection portions 33 each include a pair of groove portions 34, a plate-shaped portion 35 that is shaped as a flat plate and connects the groove portions 25, and a pair of second restriction portions 37A and 37B (one example of "restriction portion") that restrict movement of the insulating protector 23 relative to the power storage elements 11. The groove portions 34 extend along the alignment direction of the housing portions 24 such that electrical wires connected to the voltage detection terminals overlaid on the connection members 21 can pass through, and have a pair of groove walls that rise up from a groove bottom. As shown in FIG. 5, communication portions 28 that connect the groove portions 34 and the housing portions 24 are formed between the groove portions 34 and the housing portions 24, and electrical wires can pass through the communication portions 28. As shown in FIG. 2, end portions (bottom surfaces) of the connection portion 33 and the positioning portions 31, on the sides thereof where the power storage elements 11 are arranged, are first restriction portions 36 (one example of "restriction portion") that abut against the attachment surface portions 13A to restrict movement of the insulating protector 23 toward the power storage elements 11.

The pair of second restriction portions 37A and 37B are provided on the power storage element 11 side of the plate-shaped portion 35, and include a pair of parallel bending pieces 38 and locking protrusion portions 39 that protrude outward in a step-like manner from leading end portions of the pair of bending pieces 38, and the pair of bending pieces 38 are arranged in an orientation of facing away from each other. When the locking protrusion portions 39 are locked to the hole edge of the locking hole 15, separation of the insulating protector 23 from the power storage elements 11 is restricted.

Figure 4:
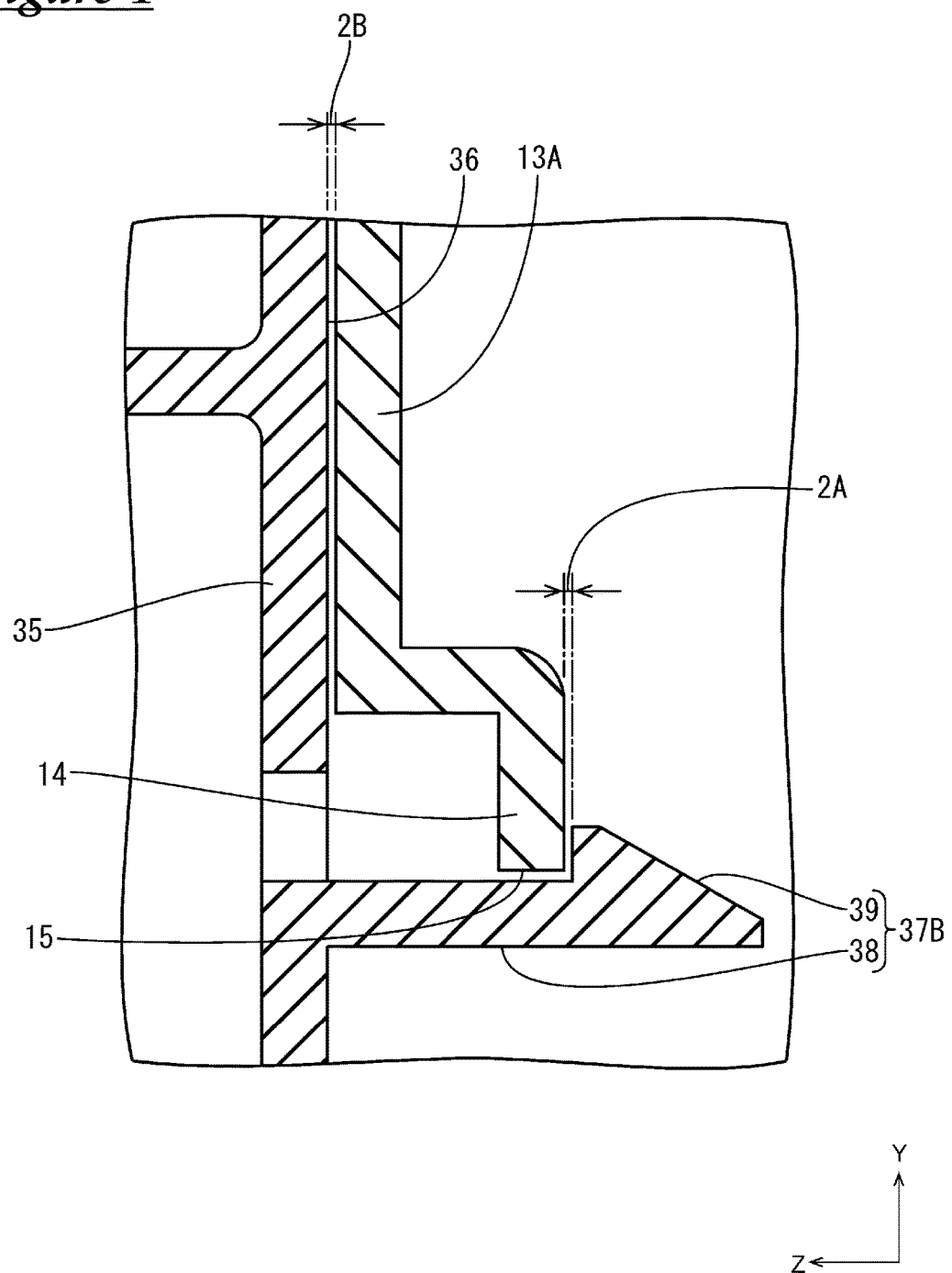
FIG. 4 is an enlarged view of the vicinity of a first restriction portion and a second restriction portion in FIG. 2.

Here, in the state where the wiring module 20 is attached to the power storage elements 11, as shown in FIG. 4, the first restriction portions 36 of the insulating protector 23 have a second clearance 2B (2B<1B) that is smaller than the first clearance 1B in the +Z direction relative to the power storage elements 11, and the second restriction portions 37A and 37B have a second clearance 2A (2A<1A) that is smaller than the first clearance 1A in the −Z direction relative to the power storage elements 11.

Next, assembly of the power storage module 10 will be described.

The insulating protector 23 is formed by coupling the coupling units 23A, the wiring module 20 is formed by housing a connection member 21 in each of the housing portions 24 (FIG. 5), and then the wiring module 20 is attached to a power storage element group in which power storage elements 11 are arranged side-by-side. The connection members 21 are then connected to the electrode portions 16A and 16B by laser welding. Accordingly, the power storage module 10 (FIG. 1) is formed. The power storage module 10 is then housed at a predetermined position in a vehicle.

Next, cases where the power storage module 10 vibrates due to vehicle vibration will be described.

Figure 7:
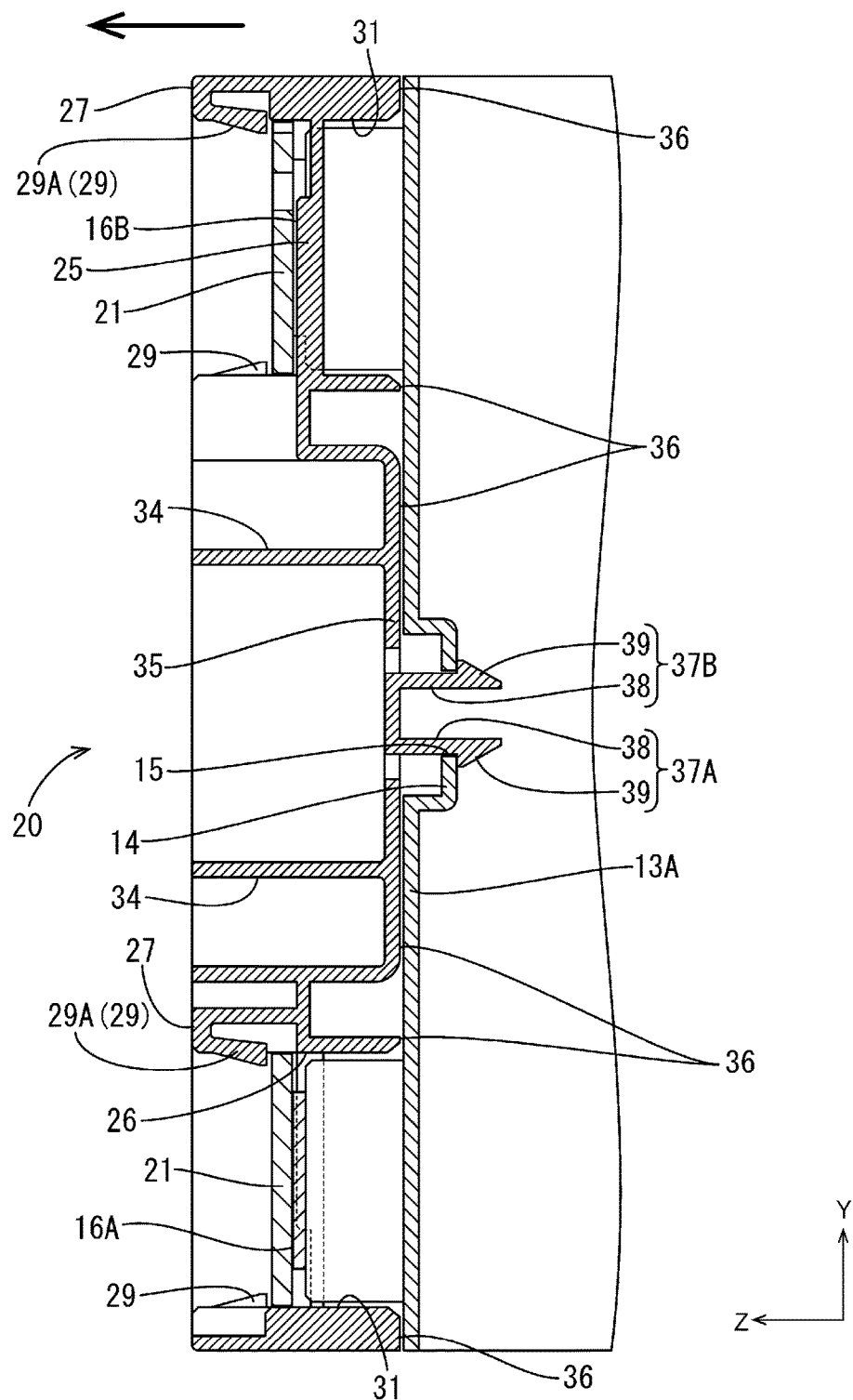
FIG. 7 shows a state where the wiring module has moved in a direction of separation from a power storage element.
Figure 8:
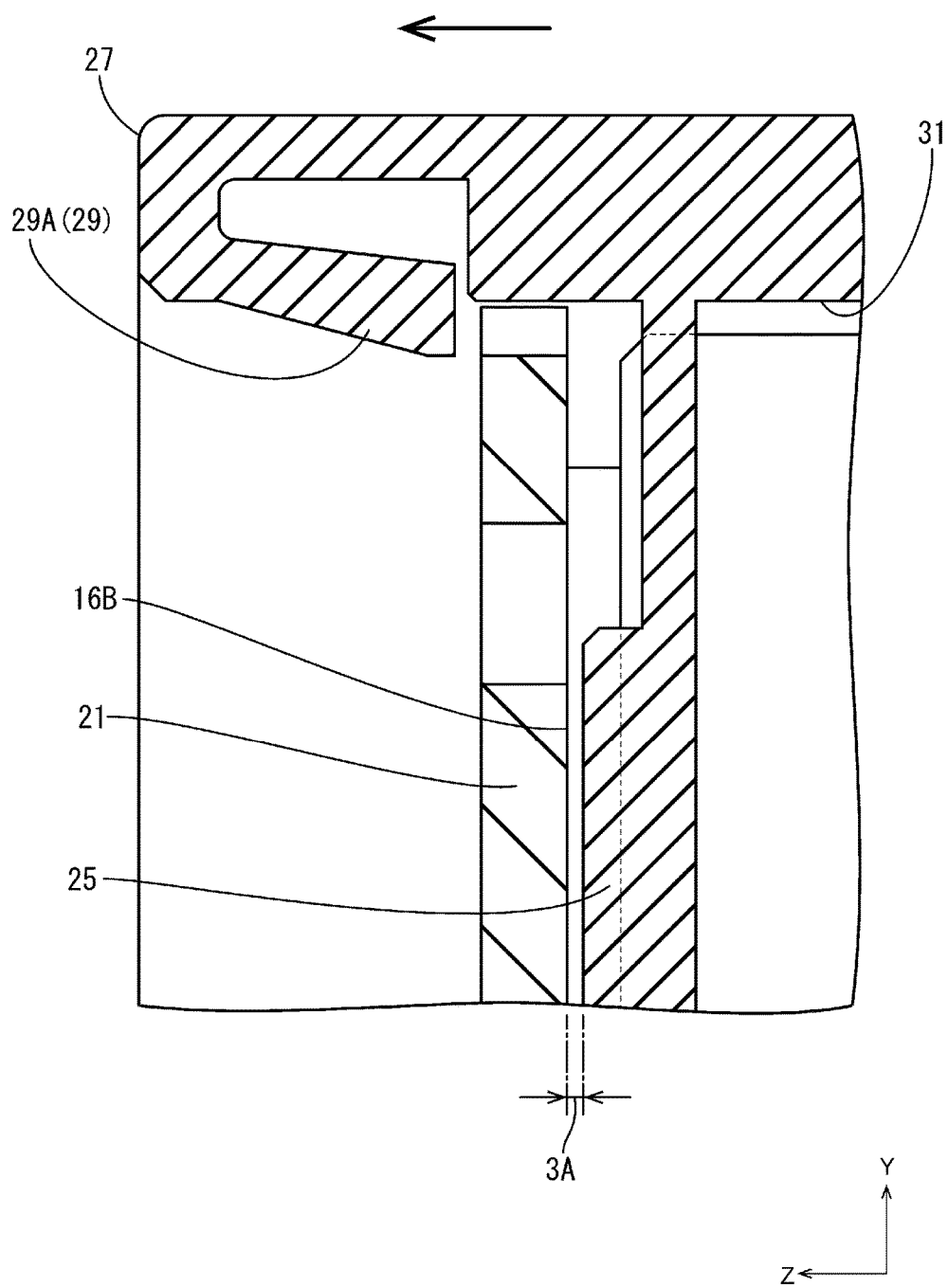
FIG. 8 is an enlarged view of the vicinity of a connection member in FIG. 7.
Figure 9:
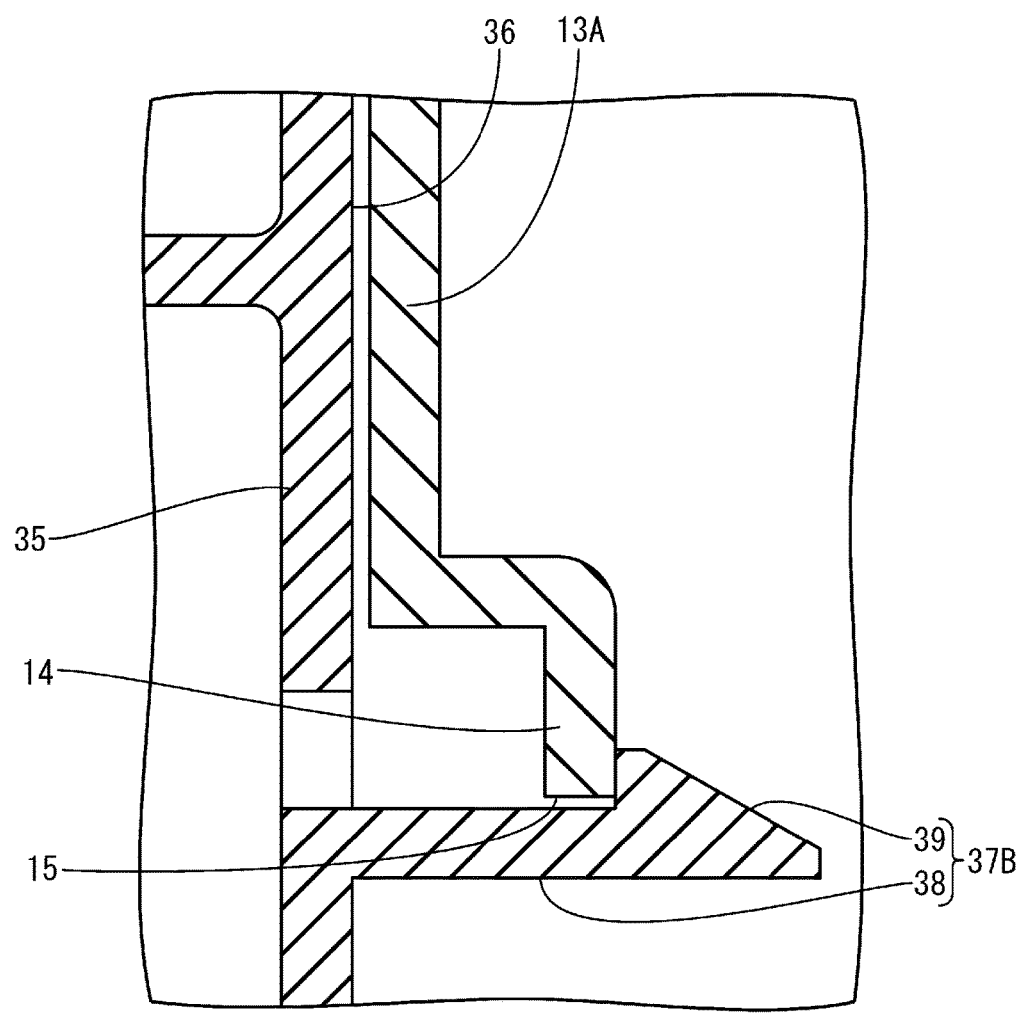
FIG. 9 is an enlarged view of the vicinity of the first restriction portion and the second restriction portion in FIG. 7.

When the insulating protector 23 moves in the +Z direction relative to the connection members 21 as shown in FIG. 7, movement of the insulating protector 23 in the +Z direction is restricted due to the locking protrusion portions 39 of the second restriction portions 37A and 37B being locked to the hole edges of the locking holes 15 of the power storage elements 11 as shown in FIG. 9. At this time, the insulating protector 23 moves a distance equal to the second clearance 2A (2A<1A), but the clearance 3A (3A>0) is formed between the connection members 21 and the opposing portions 25 as shown in FIG. 8, and therefore the opposing portions 25 do not come into contact with the connection members 21, and the opposing portions 25 do not apply a load to the connection members 21.

Figure 10:
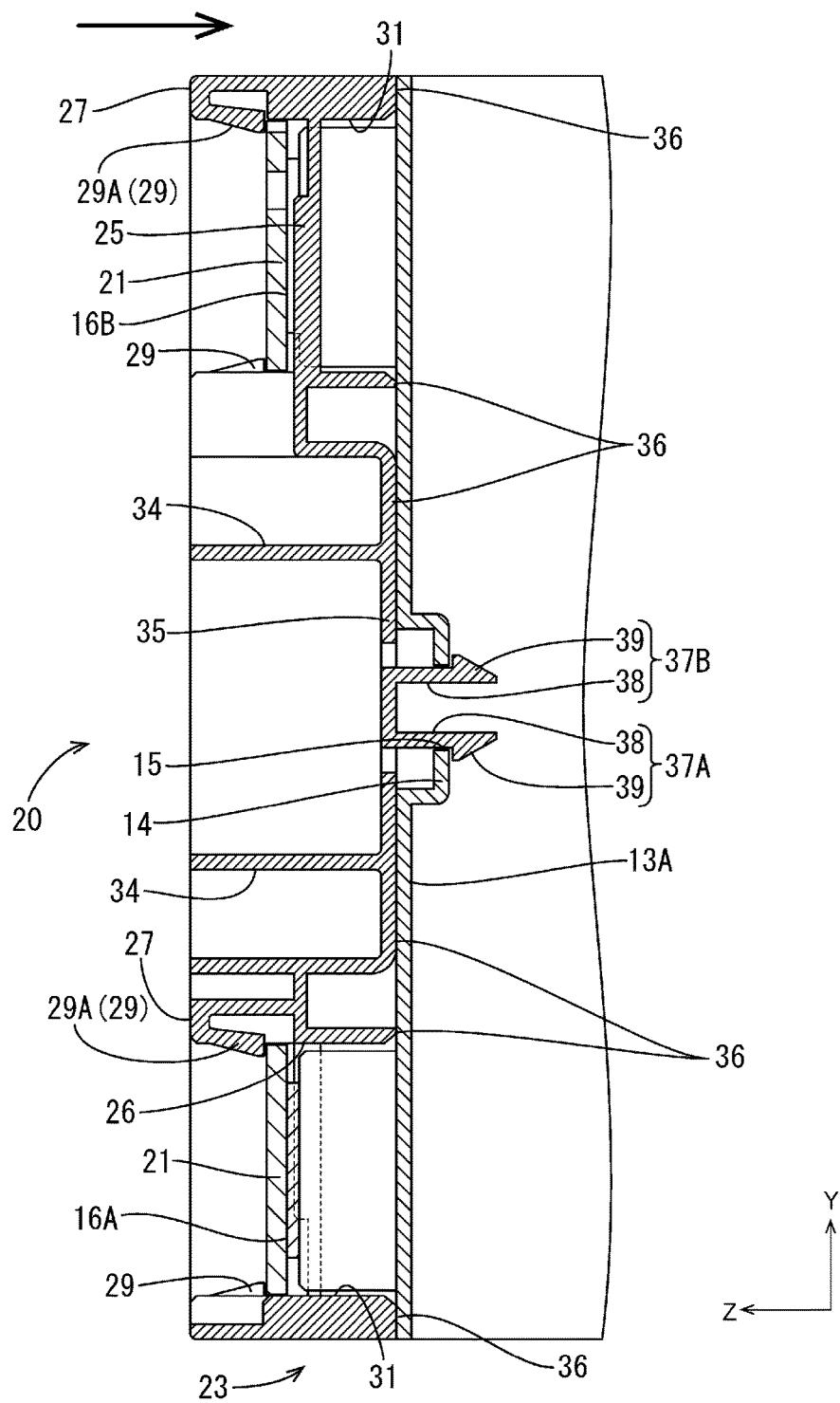
FIG. 10 shows a state where the wiring module has moved toward a power storage element.
Figure 11:
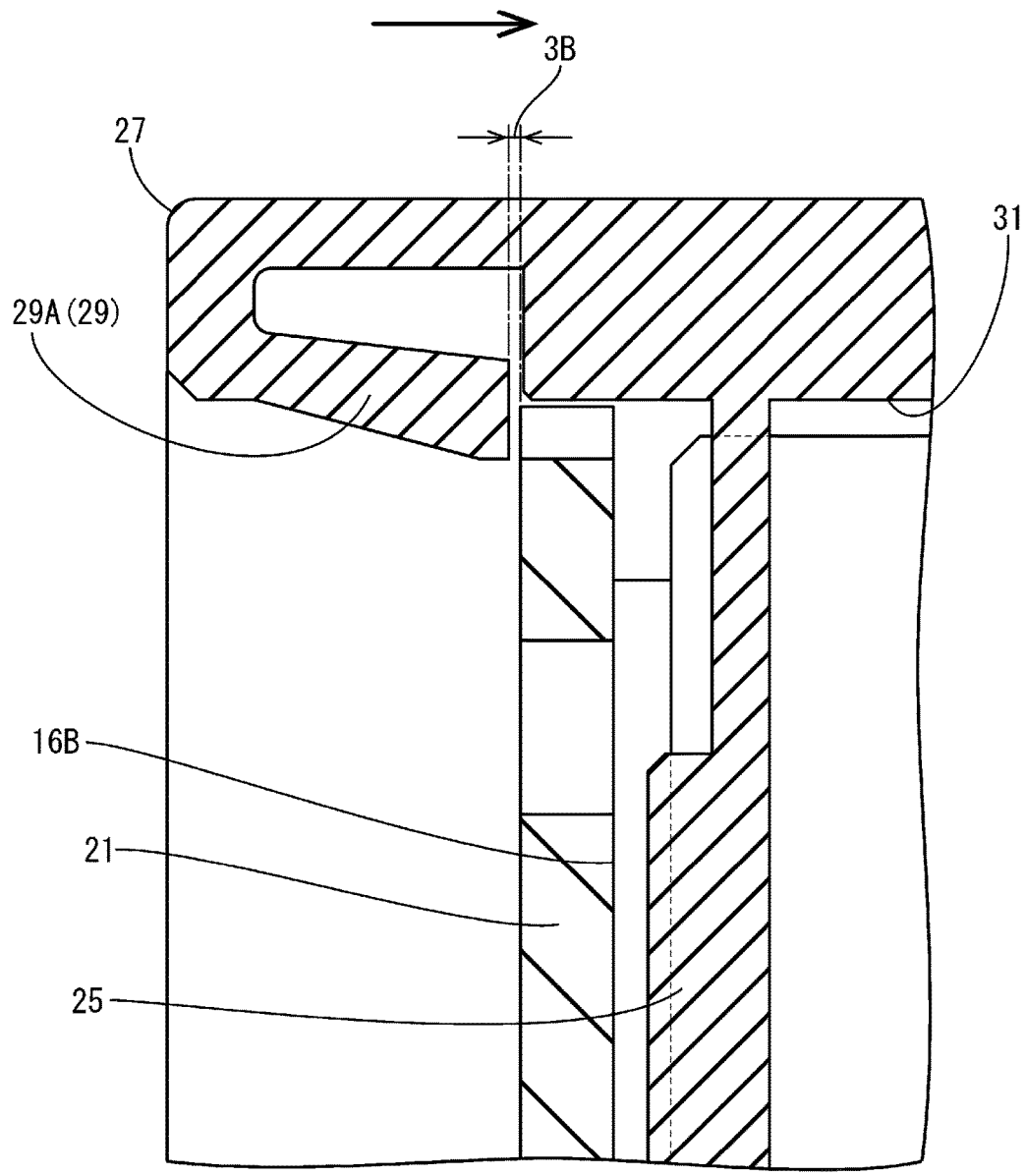
FIG. 11 is an enlarged view of the vicinity of a connection member in FIG. 10.
Figure 12:
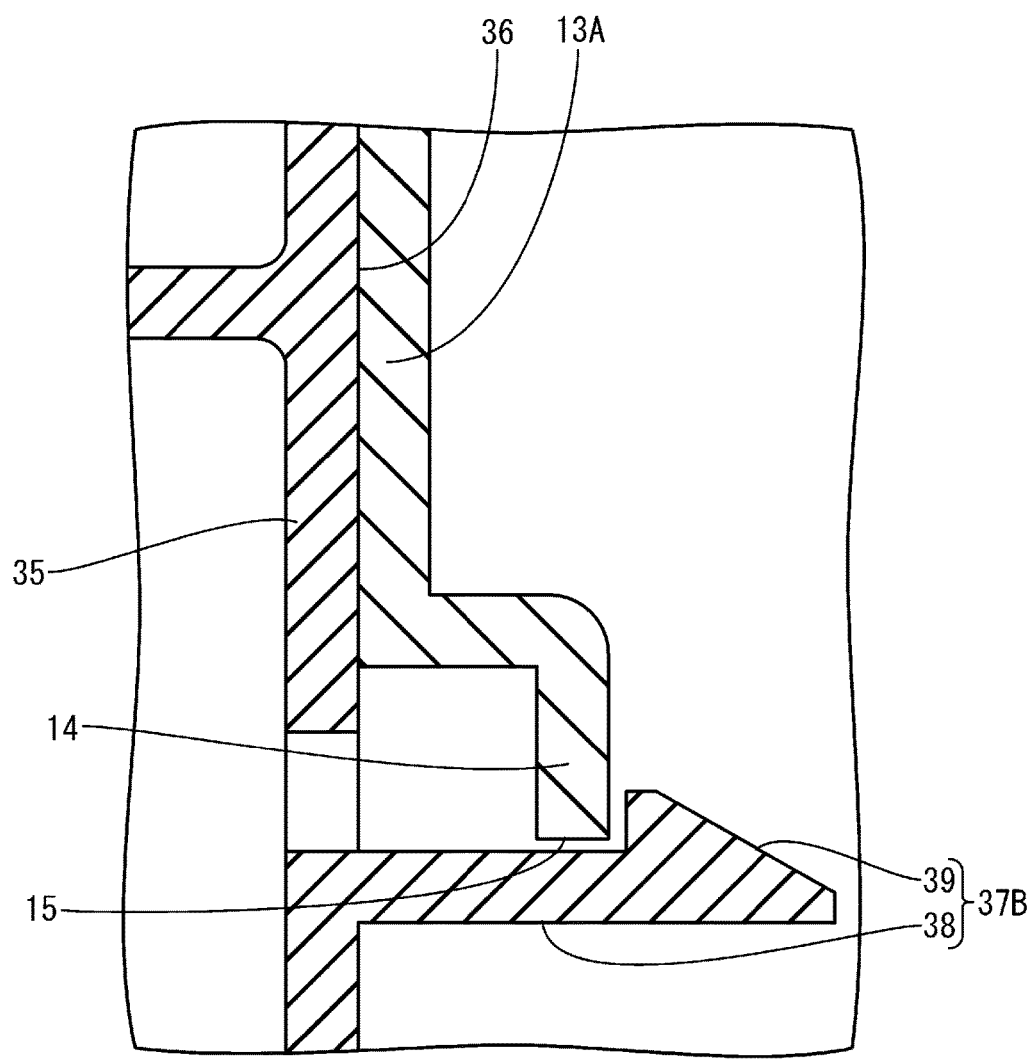
FIG. 12 is an enlarged view of the vicinity of the first restriction portion and the second restriction portion in FIG. 10.

When the insulating protector 23 moves in the −Z direction relative to the connection members 21 as shown in FIG. 10, movement of the insulating protector 23 in the −Z direction is restricted due to the first restriction portions 36 abutting against the attachment surface portions 13A of the power storage elements 11 as shown in FIG. 12. At this time, the insulating protector 23 moves a distance equal to the second clearance 2B (2B<1B), but the clearance 3B (3B>0) is formed between the connection members 21 and the withdrawal restriction portions 29 as shown in FIG. 11, and therefore the withdrawal restriction portions 29 do not come into contact with the connection members 21, and the withdrawal restriction portions 29 do not apply a load to the connection members 21.

Actions and effects described below are exhibited by the present embodiment.

When the insulating protector 23 vibrates relative to the power storage elements 11 due to vehicle vibration or the like, there is concern that the opposing portions 25 and withdrawal restriction portions 29 come into contact with the connection members 21 and apply a load to the connection members 21, but according to the present embodiment, the first restriction portions 36 and the second restriction portions 37A and 37B (restriction portions) of the insulating protector 23 restrict movement relative to the power storage element 11 by an amount greater than or equal to the second clearances 2A and 2B that are smaller than the first clearances 1A and 1B, and therefore the first restriction portions 36 and the second restriction portions 37A and 37B (restriction portions) come into contact with the power storage elements 11 before the opposing portions 25 and the withdrawal restriction portions 29 come into contact with the connection members 21, and can thus restrict movement of the insulating protector 23 relative to the power storage elements 11. Accordingly, even if the insulating protector 23 vibrates relative to the power storage elements 11, the opposing portions 25 and the withdrawal restriction portions 29 do not come into contact with the connection members 21, and therefore it is possible to suppress the application of a load to the connection members 21 from the insulating protector 23 caused by vibration.

Also, the power storage elements 11 each have the main body portion 12, in which a power storage element is housed in a case 13, and have the electrode portions 16A and 16B, and the first restriction portions 36 and the second restriction portions 37A and 37B (restriction portions) are locked to the case 13.

According to this configuration, the first restriction portions 36 and the second restriction portions 37A and 37B can be locked to the power storage element 11 with use of the cases 13 of the power storage elements 11.

The insulating protector 23 also includes the connection members 21, the housing portions 24 that house the connection members 21 and have the opposing portions 25 and the withdrawal restriction portions 29, and the connection portions 33 that connect the housing portions 24, and the first restriction portions 36 and the second restriction portions 37A and 37B are provided on the connection portions 33.

Accordingly, the application of a load to the connection members 21 by the insulating protector 23 can be suppressed with use of the configuration of the connection portions 33.

OTHER EMBODIMENTS

The present invention is not intended to be limited to the embodiment described using the above descriptions and drawings, and the technical scope of the present invention also encompasses various embodiments such as the following, for example.

Although the connection members 21 are connected to the electrode portions 16A and 16B by laser welding in the above embodiment, there is no limitation to this. For example, ultrasonic welding, resistance welding, or the like may be used. Also, there is no limitation to welding, and another fixing means may be used. For example, a configuration is possible in which bolts and nuts are used as the fixing means, bolt through-holes are formed in the connection members that are plate-shaped and made of metal, and bolt-like electrode portions are passed through the through-holes and fastened with nuts, or the shaft portions of bolts are passed through the through-holes and fastened to nut-like electrode portions.

The number of power storage elements 11 that constitute the power storage module 10 is not limited to the number described in the above embodiment, and any number can be used, and the size of the wiring module 20 can also be set appropriately according to the number of power storage elements 11.

Although the power storage elements 11 are cells, there is no limitation to this, and capacitors or the like may be used.

The orientation of the power storage module 10 is not limited to the orientation described in the above embodiment, and the power storage module 10 can be arranged in any orientation. For example, a configuration is possible in which the power storage elements 11 are arranged in an orientation in which the electrode portions 16A and 16B are arranged on the upper side, and the wiring module 20 is attached to the top of the power storage elements 11. In this case, the initial position of the wiring module 20 relative to the power storage elements 11 (position before movement) may be a position at which the insulating protector 23 comes into contact with the power storage elements 11 (second clearance 2B=0) due to the weight of the wiring module 20.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Power storage module
11 Power storage element
13 Case
16A, 16B Electrode portion
20 Wiring module
21 Connection member
23 Insulating protector
23A Coupling unit
24 Housing portion
25 Opposing portion
27 Partition wall
29A(29) Withdrawal restriction portion
31 Positioning portion
33 Connection portion
36 First restriction portion (restriction portion)
37A, 37B Second restriction portion (restriction portion)
First clearance 1A, 1B
Second clearance 2A, 2B

The invention claimed is:

1. A power storage module comprising:
a plurality of power storage elements that each have cathode and anode electrode portions;
a connection member that connects the cathodes and anodes of the power storage elements to each other and is fixed to the power storage elements by a fixing means; and
an insulating protector in which the connection member is housed,
wherein the insulating protector includes an opposing portion that opposes one surface of the connection member, and a partition wall that surrounds the connection member, the partition wall including a withdrawal restriction portion that protrudes inward from the partition wall and extends in a cantilevered manner so that he withdrawal restriction portion is capable of bending deformation and restricts withdrawal of the connection member from another surface side of the connection member, and the opposing portion and the withdrawal restriction portion have a first clearance that is the sum of a clearance between the one surface of the connection member and the opposing portion and a separate clearance between the other surface of the connection member and the withdrawal restriction portion in a state where the connection member is fixed to the power storage elements by the fixing means, and
the insulating protector further includes a restriction portion that restricts movement relative to the power storage elements by an amount greater than or equal to a second clearance that is smaller than the first clearance.

2. The power storage module according to claim 1, wherein the power storage elements each have the electrode portions and a main body portion in which a power storage element is housed in a case, and the restriction portion is locked to the case.

3. The power storage module according to claim 1, comprising:
a plurality of the connection members,
wherein the insulating protector includes a plurality of housing portions that each have the opposing portion and the withdrawal restriction portion and respectively house the connection members, and a connection portion that connects the plurality of housing portions, and the restriction portion is provided on the connection portion.

\* \* \* \* \*